(12) United States Patent　　　　(10) Patent No.:　US 12,640,592 B2
Kimura et al.　　　　　　　　　　　(45) Date of Patent:　May 26, 2026

(54) POWER SUPPLY DEVICE

(71) Applicants: TOYOTA JIDOSHA KABUSHIKI KAISHA, Toyota (JP); DENSO CORPORATION, Kariya (JP)

(72) Inventors: Kazutaka Kimura, Mishima (JP); Toshiya Hashimoto, Miyoshi (JP); Makoto Hashimoto, Seto (JP); Nobuhisa Yamaguchi, Kariya (JP); Keisuke Tani, Kariya (JP); Kazuyoshi Obayashi, Kariya (JP); Masaki Kanesaki, Susono (JP); Yuichi Takemura, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 19/109,416

(22) PCT Filed: Jul. 21, 2023

(86) PCT No.: PCT/JP2023/026775
§ 371 (c)(1),
(2) Date: Mar. 6, 2025

(87) PCT Pub. No.: WO2024/062758
PCT Pub. Date: Mar. 28, 2024

(65) Prior Publication Data
US 2026/0088657 A1　　Mar. 26, 2026

(30) Foreign Application Priority Data
Sep. 20, 2022　(JP) ................................. 2022-149270

(51) Int. Cl.
　*H02J 50/12*　　　(2016.01)
　*B60L 53/122*　　(2019.01)
　*H02H 7/122*　　(2006.01)

(52) U.S. Cl.
　CPC ............. *H02J 50/12* (2016.02); *H02H 7/122* (2013.01); *B60L 53/122* (2019.02)

(58) Field of Classification Search
　CPC ......... H02J 50/12; H02H 7/122; B60L 53/122
　　　　　　　(Continued)

(56) References Cited

U.S. PATENT DOCUMENTS

2016/0339785 A1　11/2016　Rumbak
2017/0163195 A1*　6/2017　Omata ................ H02P 29/0241

FOREIGN PATENT DOCUMENTS

JP　　　2019-526219 A　　9/2019

OTHER PUBLICATIONS

International Search Report of PCT/JP2023/026775 dated Sep. 26, 2023 [PCT/ISA/210].

* cited by examiner

*Primary Examiner* — Daniel Kessie
*Assistant Examiner* — Dru M Parries
(74) *Attorney, Agent, or Firm* — Sughrue Mion, PLLC

(57)　　　　　ABSTRACT

A power supply device that wirelessly transmits power includes: a DC power source; an inverter circuit connected to the DC power source; a resonance circuit connected to the inverter circuit and including a power transmission coil; sensors that detect a current value flowing through the circuits or a voltage value applied to the circuits; and a control device connected to the inverter circuit and the sensor. The control device controls, when causing the power supply device to wirelessly transmit power, the inverter circuit to convert a DC voltage supplied from the DC power (Continued)

source into an AC voltage and supply the AC voltage to the resonance circuit. The control device controls, when diagnosing a sensor abnormality, the inverter circuit to supply the DC voltage to the resonance circuit without converting the DC voltage into the AC voltage and diagnoses a sensor abnormality based on a present sensor detection value.

6 Claims, 10 Drawing Sheets

(58) Field of Classification Search
USPC ......................................................... 307/104
See application file for complete search history.

Fig. 4

POWER SUPPLY DEVICE

CROSS REFERENCE TO RELATED APPLICATIONS

This application is a National Stage of International Application No. PCT/JP2023/026775 filed on Jul. 21, 2023, claiming priority based on Japanese Patent Application No. 2022-149270 filed on Sep. 20, 2022.

FIELD

The present disclosure relates to a power supply device.

BACKGROUND

There is known a power supply device in which a plurality of power transmission coils for transmitting power to a vehicle in a wireless manner are arranged along a lane and the power is transmitted to the traveling vehicle (JP 2019-526219 A).

SUMMARY

In order to control the power supply device and calculate a supply power, the power supply device is provided with a sensor that detects a current flowing through its circuit or a voltage in the circuit. When an abnormality occurs in these sensors, the current or the voltage cannot be accurately detected, and control of the power supply device and calculation of the supplied power cannot be appropriately performed.

In view of the above problems, an object of the present disclosure is to enable diagnosis of abnormality of a sensor provided in a power supply device.

The gist of the present disclosure is as follows:

(1) A power supply device that transmits a power in a wireless manner, the power supply device comprising:
    a DC power source;
    an inverter circuit connected to the DC power source;
    a resonance circuit connected to the inverter circuit and including a power transmission coil;
    a sensor that detects a current value flowing through the circuits or a voltage value applied to the circuits; and
    a control device connected to the inverter circuit and the sensor, wherein
    the control device controls, when causing the power supply device to transmit the power in a wireless manner, the inverter circuit to convert a DC voltage supplied from the DC power source into an AC voltage and supply the AC voltage to the resonance circuit, and controls, when diagnosing the abnormality of the sensor, the inverter circuit to supply the DC voltage supplied from the DC power source to the resonance circuit without converting the DC voltage into the AC voltage and diagnoses an abnormality of the sensor based on a detection value of the sensor at this time.

(2) The power supply device according to above (1), wherein the control device diagnoses the abnormality of the sensor based on the detection value of the sensor after ringing occurring in the resonance circuit by a DC current being supplied to the resonance circuit converges.

(3) The power supply device according to above (1) or (2), wherein the sensor includes a first sensor that detects a current value or a voltage value between the DC power source and the inverter circuit, and a second sensor that detects a current value or a voltage value between the inverter circuit and the resonance circuit, and
the control device diagnoses that the first sensor and the second sensor are normal when the current value or the voltage value detected by the first sensor and the current value or the voltage value detected by the second sensor are the same when the DC voltage is supplied to the resonance circuit.

(4) The power supply device according to above (1) or (2), wherein
the sensor includes a sensor that detects a current value or a voltage value between the inverter circuit and the resonance circuit, and
the control device determines that the sensor is normal when the current value or the voltage value detected by the sensor when the DC voltage is supplied to the resonance circuit is within a preset predetermined range.

(5) The power supply device according to any one of above (1) to (4), wherein
the sensor includes a current sensor that detects a current value, and
the control device diagnoses an abnormality of the current sensor based on a parameter related to ringing occurring in the current value detected by the current sensor by the DC voltage being supplied to the resonance circuit.

(6) The power supply device according to any one of above (1) to (5), wherein
the sensor includes a current sensor that detects a current value, and
the control device controls the inverter circuit to supply a predetermined AC voltage to the resonance circuit after ringing occurring in the resonance circuit when the DC voltage is supplied to the resonance circuit converges, and diagnoses an abnormality of the current sensor based on a detection value of the current sensor at this time.

BRIEF DESCRIPTION OF DRAWINGS

FIG. 4 is a diagram similar to FIG. 2, schematically illustrating the configurations of the inverter circuit and the power transmission-side resonance circuit.

DESCRIPTION OF EMBODIMENTS

Figure 1:
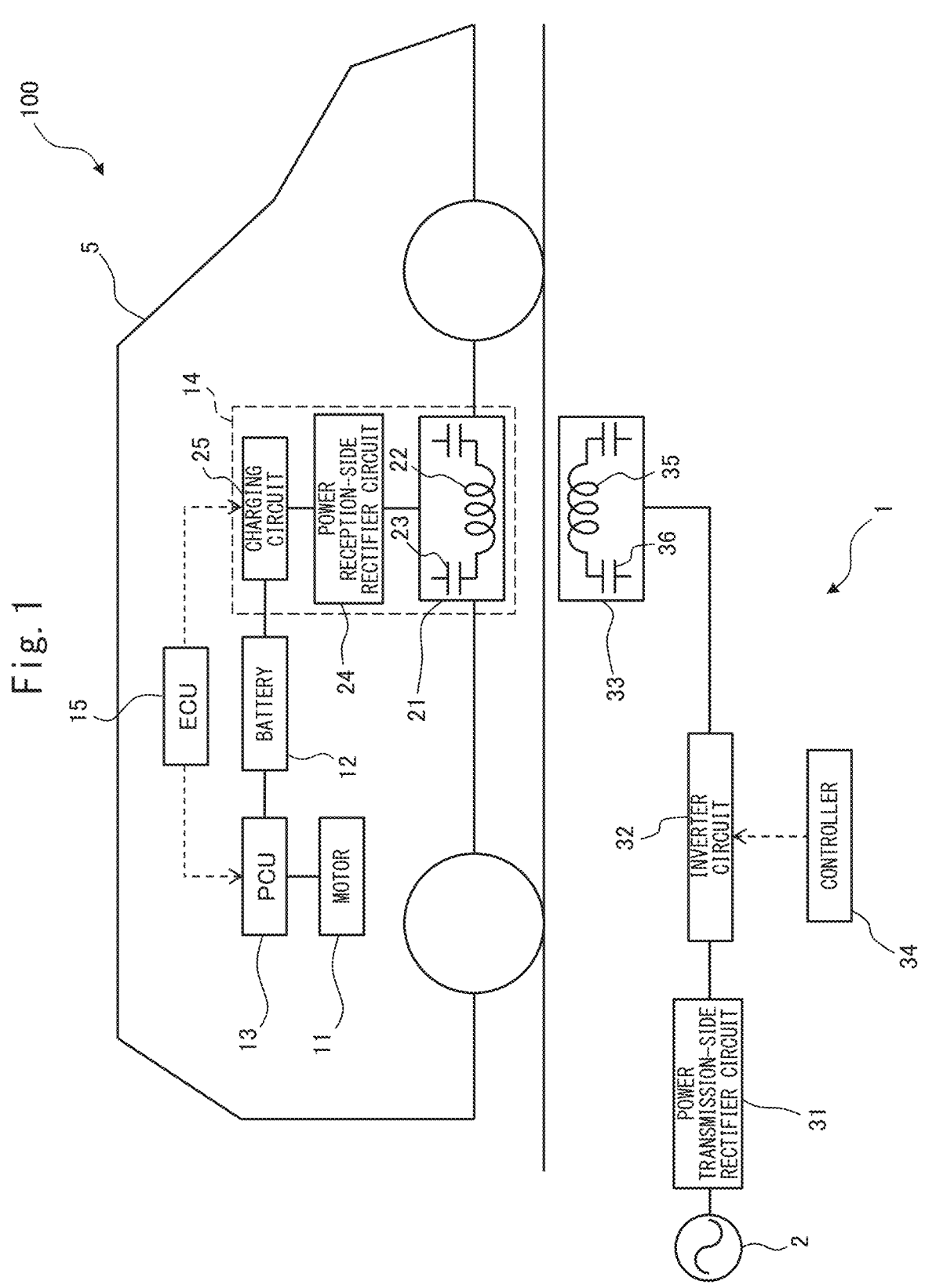
FIG. 1 is a diagram schematically illustrating a configuration of a wireless power supply system including a ground power supply device.

Hereinafter, embodiments will be described in detail with reference to the drawings. In the following description, similar components are denoted by the same reference numerals.

First Embodiment

<Outline of Wireless Power Supply System>

FIG. 1 is a diagram schematically illustrating a configuration of a wireless power supply system 100 including a ground power supply device 1 according to a first embodiment. The wireless power supply system 100 includes a ground power supply device 1 and a vehicle 5 capable of receiving a power from the ground power supply device 1. In the wireless power supply system 100, wireless power is transmitted by magnetic field resonance coupling (magnetic field resonance) from the ground power supply device 1 to the vehicle 5. In the present embodiment, the wireless power transmission is performed not only when the vehicle 5 is stopped but also while the vehicle 5 is traveling.

The ground power supply device 1 includes a power transmission coil 35 configured to transmit the power to the vehicle 5 in a wireless manner, and the vehicle 5 includes a power reception coil 22 configured to receive the power in a wireless manner. When the power is supplied to the power transmission coil 35 of the ground power supply device 1, a magnetic field is generated by the power transmission coil 35. When the power reception coil 22 of the vehicle 5 is located on the power transmission coil 35, a current flows through the power reception coil 22 by the magnetic field generated by the power transmission coil 35, and thus, the power is received by the power reception coil 22.

<Configuration of Vehicle>

Next, a configuration of the vehicle 5 will be described with reference to FIG. 1. As illustrated in FIG. 1, the vehicle 5 includes a motor 11, a battery 12, a power control unit (PCU) 13, a power reception unit 14, and an electronic control unit (ECU) 15. The vehicle 5 is an electric vehicle (BEV) in which the motor 11 drives the vehicle 5, or a hybrid vehicle (HEV) in which an internal combustion engine, in addition to the motor 11, drives the vehicle 5.

The motor 11 is, for example, an AC synchronous motor, and functions as an electric motor and a generator. The motor 11 functions as an electric motor and is driven using the power stored in the battery 12 as a power source. The output of the motor 11 is transmitted to the wheel via a reduction gear and an axle.

The battery 12 is a rechargeable secondary battery, and includes, for example, a lithium ion battery, a nickel hydrogen battery, or the like. The battery 12 stores the power necessary for traveling of the vehicle 5 (for example, driving electric power of the motor 11). When the power received by the power reception unit 14 is supplied to the battery 12, the battery 12 is charged. The battery 12 may also be chargeable by an external power source other than the ground power supply device 1 via a charging port provided in the vehicle 5.

The PCU 13 is electrically connected to the motor 11 and the battery 12. The PCU 13 includes an inverter, a boost converter, and a DC/DC converter. The inverter converts the DC power supplied from the battery 12 into the AC power, and supplies the AC power to the motor 11. The boost converter boosts the voltage of the battery 12 as necessary when the power stored in the battery 12 is supplied to the motor 11. The DC/DC converter steps down the voltage of the battery 12 when the power stored in the battery 12 is supplied to an electronic device such as a headlight.

The power reception unit 14 receives the power from the power transmission coil 35 and supplies the received power to the battery 12. The power reception unit 14 includes a power reception-side resonance circuit 21, a power reception-side rectifier circuit 24, and a charging circuit 25.

The power reception-side resonance circuit 21 is disposed at a bottom of the vehicle 5 so that a distance from the road surface is small. The power reception-side resonance circuit 21 includes the power reception coil 22 and a power reception-side resonance capacitor 23. The power reception coil 22 is configured such that a current flows through the power reception coil 22 when a magnetic field is generated around the power reception coil. The power reception coil 22 and the power reception-side resonance capacitor 23 constitute a resonator. Various parameters (the outer diameter and inner diameter of the power reception coil 22, the number of turns of the power reception coil 22, the electrostatic capacitance of the power reception-side resonance capacitor 23, and the like) of the power reception coil 22 and the power reception-side resonance capacitor 23 are determined such that the resonance frequency of the power reception-side resonance circuit 21 matches the resonance frequency of the power transmission-side resonance circuit 33. As long as a deviation amount between the resonance frequency of the power reception-side resonance circuit 21 and the resonance frequency of the power transmission-side resonance circuit 33 is small, for example, as long as the resonance frequency of the power reception-side resonance circuit 21 is within a range of ±10% of the resonance frequency of the power transmission-side resonance circuit 33, the resonance frequency of the power reception-side resonance circuit 21 does not necessarily coincide with the resonance frequency of the power transmission-side resonance circuit 33.

The power reception-side rectifier circuit 24 is electrically connected to the power reception-side resonance circuit 21 and the charging circuit 25. The power reception-side rectifier circuit 24 rectifies the AC power supplied from the power reception-side resonance circuit 21 to convert the AC power into the DC power, and supplies the DC power to the charging circuit 25. The power reception-side rectifier circuit 24 is, for example, an AC/DC converter.

The charging circuit 25 is electrically connected to the power reception-side rectifier circuit 24 and the battery 12. The charging circuit 25 converts the DC power supplied from the power reception-side rectifier circuit 24 into a voltage level of the battery 12, and supplies the DC power to the battery 12. When the power transmitted from the power transmission coil 35 is supplied to the battery 12 by the power reception unit 14, the battery 12 is charged. The charging circuit 25 is, for example, a DC/DC converter.

An ECU 15 performs various controls of the vehicle 5. For example, the ECU 15 is electrically connected to the charging circuit 25 of the power reception unit 14, and controls the charging circuit 25 to control charging of the battery 12 by the power transmitted from the power transmission coil 35. Furthermore, the ECU 15 is electrically connected to the PCU 13, and controls the PCU 13 to control exchange of the power between the battery 12 and the motor 11.

<Configuration of Ground Power Supply Device>

Next, a configuration of the ground power supply device 1 will be schematically described with reference to FIG. 1. As illustrated in FIG. 1, the ground power supply device 1 includes a power source 2, a power transmission-side rectifier circuit 31, an inverter circuit 32, the power transmission-side resonance circuit 33, and a controller 34. In the present embodiment, one ground power supply device 1 includes, for example, a plurality of the power transmission coils 35 embedded, in a line, in a lane of a road.

The power source 2 supplies the power to the power transmission-side resonance circuit 33 via the power transmission-side rectifier circuit 31 and the inverter circuit 32. The power source 2 is, for example, a commercial AC power supply that supplies single-layer AC power.

The power source 2 may be another AC power source that supplies three-phase AC power, or may be a DC power source such as a fuel cell.

The power transmission-side rectifier circuit 31 is electrically connected to the power source 2 and the inverter circuit 32. The power transmission-side rectifier circuit 31 rectifies an AC power supplied from the power source 2 to convert the AC power into a DC power, and supplies the DC power to the inverter circuit 32. The power transmission-side rectifier circuit 31 is, for example, an AC/DC converter. In the present embodiment, one ground power supply device 1 is provided with one power transmission-side rectifier circuit 31. Since the power transmission-side rectifier circuit 31 supplies the DC power to the inverter circuit 32, the power source 2 and the power transmission-side rectifier circuit 31 function as the DC power supplies in the present embodiment. When the power source 2 is the DC power source, the power transmission-side rectifier circuit 31 may be omitted. The power transmission-side rectifier circuit 31 may be embedded underground or may be provided on the ground.

The inverter circuit 32 is electrically connected to the power transmission-side rectifier circuit 31 and the power transmission-side resonance circuit 33. The inverter circuit 32 converts the DC power supplied from the power transmission-side rectifier circuit 31 into an AC power (high-frequency AC power) having a higher frequency than that of the AC power of the power source 2, and supplies the high-frequency AC power to the power transmission-side resonance circuit 33. In the present embodiment, one ground power supply device 1 includes the inverter circuits 32 of which the number corresponds to the number of power transmission coils 35. Each of the inverter circuits 32 is connected to one of the corresponding power transmission-side resonance circuits 33 different from each other. A specific circuit configuration of the inverter circuit 32 will be described later with reference to FIG. 2. The inverter circuit 32 may be embedded underground or may be provided on the ground.

The power transmission-side resonance circuit 33 is connected to the inverter circuit 32. The plurality of power transmission-side resonance circuits 33 are provided in one ground power supply device 1. Each of the power transmission-side resonance circuits 33 includes the power transmission coil 35 and a power transmission-side resonance capacitor 36. In each of the power transmission-side resonance circuits 33, when a high-frequency power is supplied from the inverter circuit 32, the power transmission coil 35 generates an alternating magnetic field. The power transmission coil 35 and the power transmission-side resonance capacitor 36 constitute a resonator. Various parameters (the outer shape and inner diameter of the power transmission coil 35, the number of turns of the power transmission coil 35, electrostatic capacitance of the power transmission-side resonance capacitor 36, and the like) of the power transmission coil 35 and the power transmission-side resonance capacitor 36 are determined such that a resonance frequency of the power transmission-side resonance circuit 33 becomes a predetermined set value. The predetermined set value is, for example, from 10 kHz to 100 GHz, and is preferably 85 kHz defined by the SAE TIR J2954 standard as a frequency band for wireless power transmission. In the present embodiment, all the power transmission-side resonance circuits 33 are configured such that various parameters of the power transmission coil 35 and the power transmission-side resonance capacitor 36 are the same. In other words, all the power transmission-side resonance circuits 33 have the same configuration.

The controller 34 is, for example, a general-purpose computer, and performs various controls of the ground power supply device 1. In particular, the controller 34 functions as a control device that controls a power supply device. For example, the controller 34 is electrically connected to the inverter circuit 32, and controls the inverter circuit 32 to control power transmission by the power transmission coil 35. Specifically, for example, the controller 34 specifies the power transmission coil 35 on which the vehicle 5 is located based on a detection value of an arbitrary sensor (not illustrated), and controls the inverter circuit 32 to supply the power to the specified power transmission coil 35. The controller 34 includes a processor that executes various processes, and a memory that stores a program for the processor to execute various processes, various data used when the processor executes various processes, and the like.

The power transmission coil 35 and the power transmission-side resonance capacitor 36 of the power transmission-side resonance circuit 33 are embedded underground. In particular, the power transmission coil 35 is disposed such that its center is located at the center of a charging compartment. Alternatively, the power transmission coil 35 is disposed such that its center is located at the center of a lane.

In the wireless power supply system 100 configured as described above, when the power reception coil 22 of the vehicle 5 faces the power transmission coil 35 of the ground power supply device 1 as illustrated in FIG. 1, the AC power is supplied to the power transmission-side resonance circuit 33, and the alternating magnetic field is generated by the power transmission coil 35. When the alternating magnetic field is generated in this way, oscillation of the alternating magnetic field is transmitted to the power reception coil 22. As a result, an induced current flows in the power reception coil 22 by electromagnetic induction, and an induced electromotive force is generated in the power reception-side resonance circuit 21 by the induced current. That is, the power is transmitted from the power transmission-side resonance circuit 33 to the power reception unit 14 including the power reception-side resonance circuit 21.

<Description of Electronic Circuit>

Figure 2:
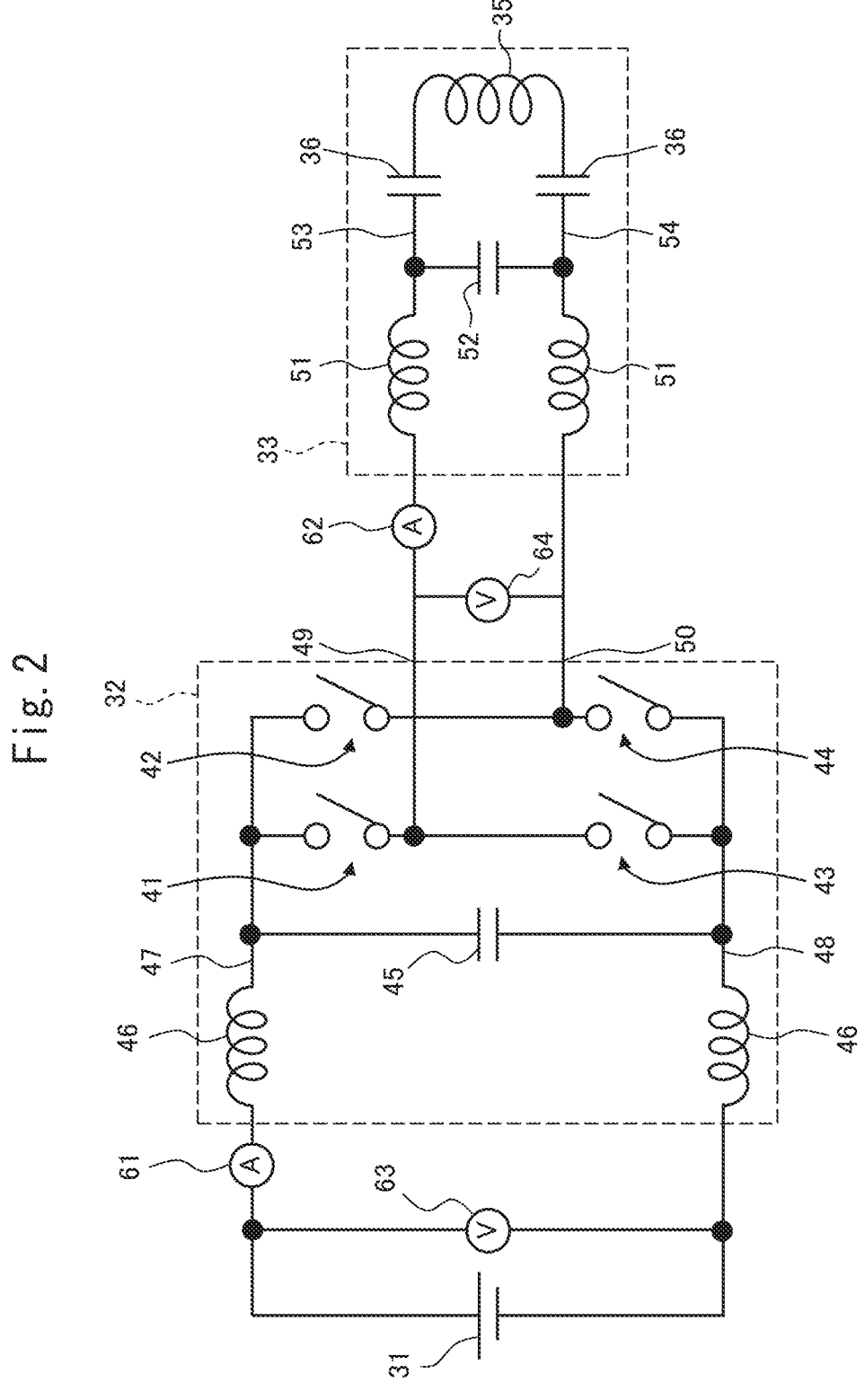
FIG. 2 is a diagram schematically illustrating configurations of an inverter circuit and a power transmission-side resonance circuit.

Next, an electronic circuit including the inverter circuit 32 and the power transmission-side resonance circuit 33 will be described with reference to FIG. 2. FIG. 2 is a diagram schematically illustrating configurations of the inverter circuit 32 and the power transmission-side resonance circuit 33.

As illustrated in FIG. 2, the inverter circuit 32 includes four switching transistors 41 to 44, a smoothing capacitor 45, and a first normal mode choke coil 46.

The four switching transistors 41 to 44 constitute an H-bridge circuit. The first switching transistor 41 and the third switching transistor 43 are connected in series, and the second switching transistor 42 and the fourth switching transistor 44 are connected in series. Two sets of the switching transistors 41 to 44 connected in series are connected to a positive electrode line 47 connected to a positive electrode of the power transmission-side rectifier circuit 31 and a negative electrode line 48 connected to a negative electrode of the power transmission-side rectifier circuit 31.

Specifically, the first switching transistor 41 and the second switching transistor 42 is connected to the positive electrode line 47. On the other hand, the third switching transistor 43 and the fourth switching transistor 44 is connected to the negative electrode line 48. A portion between the first switching transistor 41 and the second switching transistor 42 is connected to a first output terminal 49 of the inverter circuit 32. On the other hand, a portion between the third switching transistor 43 and the fourth switching transistor 44 is connected to a second output terminal 50 of the inverter circuit 32. Therefore, the first switching transistor 41 is provided between the positive electrode line 47 and the first output terminal 49, and the second switching transistor 42 is provided between the positive electrode line 47 and the second output terminal 50. The third switching transistor 43 is provided between the negative electrode line 48 and the first output terminal 49, and the fourth switching transistor 44 is provided between the negative electrode line 48 and the second output terminal 50. These switching transistors 41 to 44 are connected to the controller 34, and controlled to be turned on and off by the controller 34.

The smoothing capacitor 45 is provided between the positive electrode line 47 and the negative electrode line 48. The smoothing capacitor 45 is used to smooth the current rectified in the power transmission-side rectifier circuit 31.

The first normal mode choke coil 46 is connected in series to each of the positive electrode line 47 and the negative electrode line 48. In particular, the first normal mode choke coil 46 is connected to each of the positive electrode line 47 and the negative electrode line 48 on the power transmission-side rectifier circuit 31 side relative to the switching transistors 41 to 44 and the smoothing capacitor 45. The first normal mode choke coil 46 can reduce normal mode noise generated in the inverter circuit 32 and the power transmission-side resonance circuit 33.

The inverter circuit 32 may be provided with another filter element for noise reduction. For example, an X capacitor and a Y capacitor may be provided between the positive electrode line 47 and the negative electrode line 48. Alternatively, a common mode choke coil in which a conductive wire connected in series to the positive electrode line 47 and a conductive wire connected in series to the negative electrode line 48 are wound around one core material may be provided. Alternatively, the inverter circuit 32 may not be provided with a filter element.

As described above, the power transmission-side resonance circuit 33 includes the power transmission coil 35 and the power transmission-side resonance capacitor 36. In addition, the power transmission-side resonance circuit 33 includes a second normal mode choke coil 51 and an X capacitor 52.

One end of the power transmission coil 35 is connected to the first line 53 connected to the first output terminal 49 of the inverter circuit 32. The other end of the power transmission coil 35 is connected to the second line 54 connected to the second output terminal 50 of the inverter circuit 32. Therefore, the first output terminal 49 of the inverter circuit 32 is connected to one end of the power transmission coil 35. On the other hand, the second output terminal 50 of the inverter circuit 32 is connected to the other end of the power transmission coil 35.

In the present embodiment, the two power transmission-side resonance capacitors 36 are connected in series to the first line 53 and the second line 54, respectively. The power transmission-side resonance capacitor 36 may be provided in any form as long as it constitutes a resonator together with the power transmission coil 35. Therefore, the power transmission-side resonance capacitor 36 may be connected in series to only one of the first line 53 and the second line 54, or may be connected in parallel to the power transmission coil 35 between the first line 53 and the second line 54.

The second normal mode choke coil 51 is connected in series to each of the first line 53 and the second line 54. In particular, the second normal mode choke coil 51 is connected to each of the first line 53 and the second line 54 between the output terminals 49 and 50 of the inverter circuit 32 and the X capacitor 52. The second normal mode choke coil 51 can reduce normal mode noise generated in the power transmission-side resonance circuit 33.

The X capacitor 52 is a capacitor provided between the first line 53 and the second line 54. The X capacitor 52 can reduce normal mode noise generated in the power transmission-side resonance circuit 33.

Figure 3:
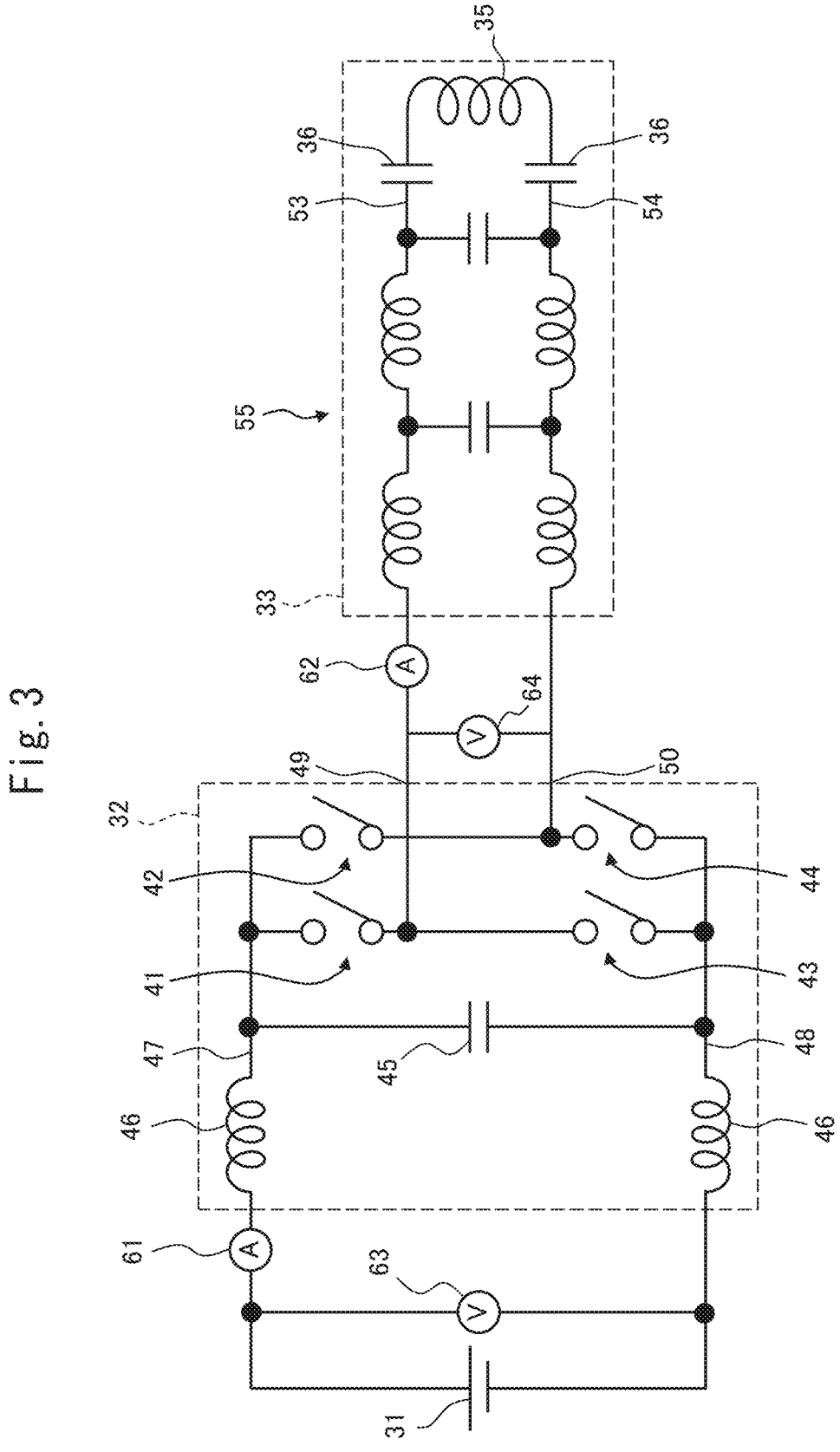
FIG. 3 is a diagram, similar to FIG. 2, schematically illustrating the configurations of the inverter circuit and the power transmission-side resonance circuit.
Figure 4:
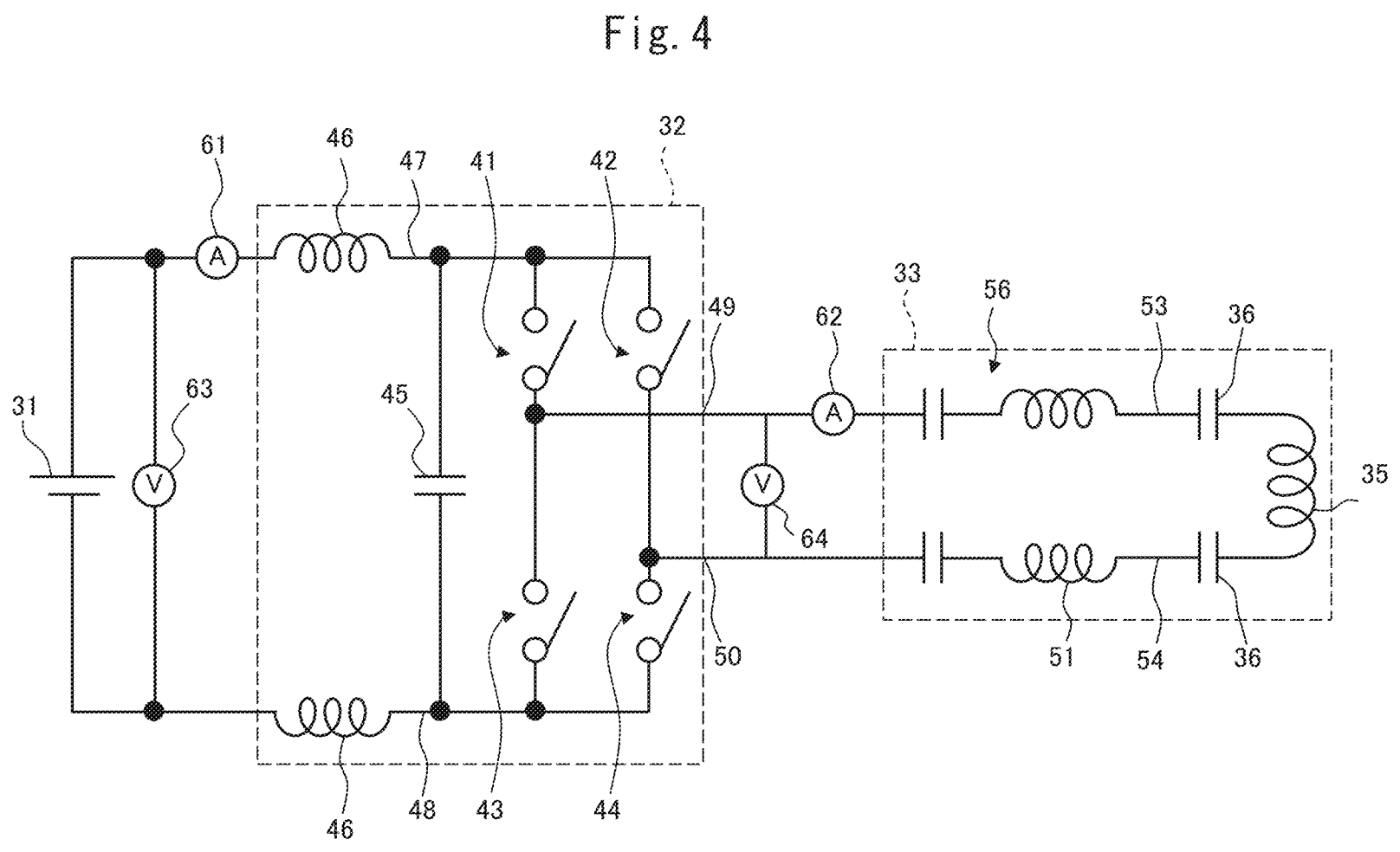

The power transmission-side resonance circuit 33 may be provided with another filter element for noise reduction. For example, a Y capacitor may be provided between the first line 53 and the second line 54. Alternatively, a common mode choke coil in which a conductive wire connected in series to the first line 53 and a conductive wire connected in series to the second line 54 are wound around one core material may be provided. Alternatively, the power transmission-side resonance circuit 33 may not be provided with a filter element. The filter element (filter circuit) is not limited to an immittance conversion filter, and may have another circuit format. For example, the filter circuit may be a fourth order filter 55 as illustrated in FIG. 3 or a band pass filter 56 as illustrated in FIG. 4.

The ground power supply device 1 of the present embodiment further includes sensors 61 to 64 that detect a current flowing through the inverter circuit 32 and the power transmission-side resonance circuit 33 and a voltage applied to the inverter circuit 32 and the power transmission-side resonance circuit 33. These sensors 61 to 64 are connected to the controller 34 and transmit detection results to the controller 34.

The first current sensor 61 is provided on the positive electrode line 47 between the power transmission-side rectifier circuit 31 and the inverter circuit 32. The first current sensor 61 detects a value of the current flowing through the positive electrode line 47. The first current sensor 61 may be provided at another position such as between the switching transistors 41 and 42 and the first normal mode choke coil 46 as long as the first current sensor is connected in series to the positive electrode line 47. Alternatively, the first current sensor 61 may be provided on the negative electrode line 48.

The second current sensor 62 is provided on the first line 53 between the inverter circuit 32 and the power transmission-side resonance circuit 33. The second current sensor 62 detects the value of the current flowing through the first line 53. The second current sensor 62 may be provided at another position such as between the power transmission coil 35 and the second normal mode choke coil 51 as long as the second current sensor is connected in series with the first line 53. Alternatively, the second current sensor 62 may be provided on the negative electrode line 48.

The first voltage sensor 63 is provided between the positive electrode line 47 and the negative electrode line 48 between the power transmission-side rectifier circuit 31 and the inverter circuit 32. The first voltage sensor 63 detects a voltage value between the positive electrode line 47 and the negative electrode line 48. As long as the first voltage sensor 63 is connected to the positive electrode line 47 and the negative electrode line 48 therebetween, the first voltage sensor may be provided at another position such as between the switching transistors 41 and 42 and the first normal mode choke coil 46.

The second voltage sensor 64 is provided between the first line 53 and the second line 54 between the inverter circuit 32 and the power transmission-side resonance circuit 33. The second voltage sensor 64 detects a voltage value between the first line 53 and the second line 54. As long as the second voltage sensor 64 is connected to the first line 53 and the second line 54 therebetween, the second voltage sensor may be provided at another position such as between the power transmission coil 35 and the second normal mode choke coil 51.

In the ground power supply device 1 of the present embodiment, the four sensors 61 to 64 that detect a current or a voltage are provided. However, the ground power supply device 1 only needs to be provided with only at least one of these sensors. A plurality of the first current sensors 61, a plurality of the second current sensors 62, a plurality of the first voltage sensors 63, and a plurality of the second voltage sensors 64 may be provided. In this case, the sensors are arranged at different locations. For example, one of the plurality of second current sensors 62 is disposed on the first line 53 between the first output terminal 49 of the inverter circuit 32 and the second normal mode choke coil 51, and another second current sensor is disposed on the first line 53 between the power transmission coil 35 and the power transmission-side resonance capacitor 36.

<Operation During Power Transmission>

Figures 5A, 5B:
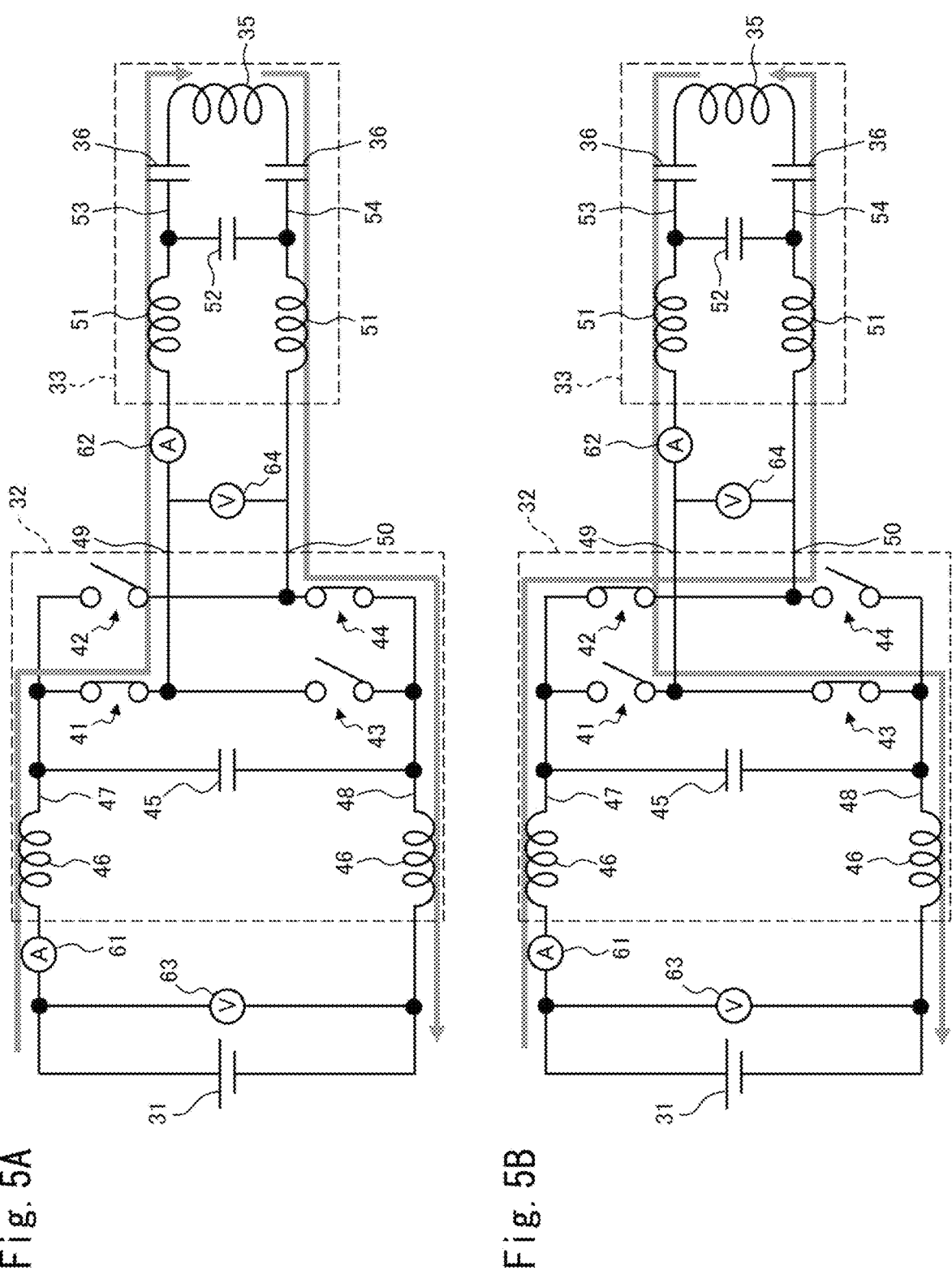
FIGS. 5A and 5B are diagrams for explaining a current flow in the inverter circuit and the power transmission-side resonance circuit during power transmission.

Next, a current flow in the inverter circuit 32 and the power transmission-side resonance circuit 33 during power transmission will be described with reference to FIGS. 5A and 5B. FIGS. 5A and 5B are diagrams for explaining a current flow in the inverter circuit 32 and the power transmission-side resonance circuit 33 during power transmission.

During power transmission, the switching transistors 41 to 44 of the inverter circuit 32 are selectively connected, and the AC power is output from the output terminals 49 and 50 of the inverter circuit 32. Specifically, in the inverter circuit 32, the first connection state and the second connection state are intermittently and alternately repeated so that the AC power is output.

In the first connection state, as illustrated in FIG. 5A, the first switching transistor 41 and the fourth switching transistor 44 are turned on, and the second switching transistor 42 and the third switching transistor 43 are turned off. In this case, the positive electrode line 47 is connected to the first output terminal 49, and thus connected to the first line 53. On the other hand, the negative electrode line 48 is connected to the second output terminal 50, and thus connected to the second line 54.

In the second connection state, as illustrated in FIG. 5B, the second switching transistor 42 and the third switching transistor 43 are turned on, and the first switching transistor 41 and the fourth switching transistor 44 are turned off. In this case, the positive electrode line 47 is connected to the second output terminal 50, and thus connected to the second line 54. On the other hand, the negative electrode line 48 is connected to the first output terminal 49, and thus connected to the first line 53.

During power transmission, the first connection state and the second connection state as described above are intermittently and alternately repeated in the inverter circuit 32, whereby the AC power of, for example, 85 kHz is output from the output terminals 49 and 50 of the inverter circuit 32. When the AC power is output from the inverter circuit 32 in this way, the AC power is supplied to the power transmission-side resonance circuit 33, and as a result, an alternating magnetic field is generated in the power transmission coil 35. That is, in the present embodiment, when causing the ground power supply device 1 to transmit the power in a wireless manner, the controller 34 controls the inverter circuit 32 to convert the DC voltage supplied from the power transmission-side rectifier circuit 31 into an AC voltage and supply the AC voltage to the power transmission-side resonance circuit 33.

<Detection of Sensor Abnormality>

As described above, the ground power supply device 1 is provided with the sensors 61 to 64 that detect a current value or a voltage value. The detection values of these sensors 61 to 64 are input to the controller 34. The controller 34 controls the inverter circuit 32 (controls the switching transistors 41 to 44), and calculates an amount of the power supplied by the ground power supply device 1 based on the current value or the voltage value detected by the sensors 61 to 64. Therefore, when an abnormality occurs in the sensors 61 to 64 and the sensor 61 to 64 no longer detect a value corresponding to an actual current or voltage, the inverter circuit 32 cannot be appropriately controlled, and the amount of the power supplied by the ground power supply device 1 cannot be appropriately calculated. Thus, in the present embodiment, the abnormality diagnosis of the sensors 61 to 64 is performed.

Figures 6A, 6B:
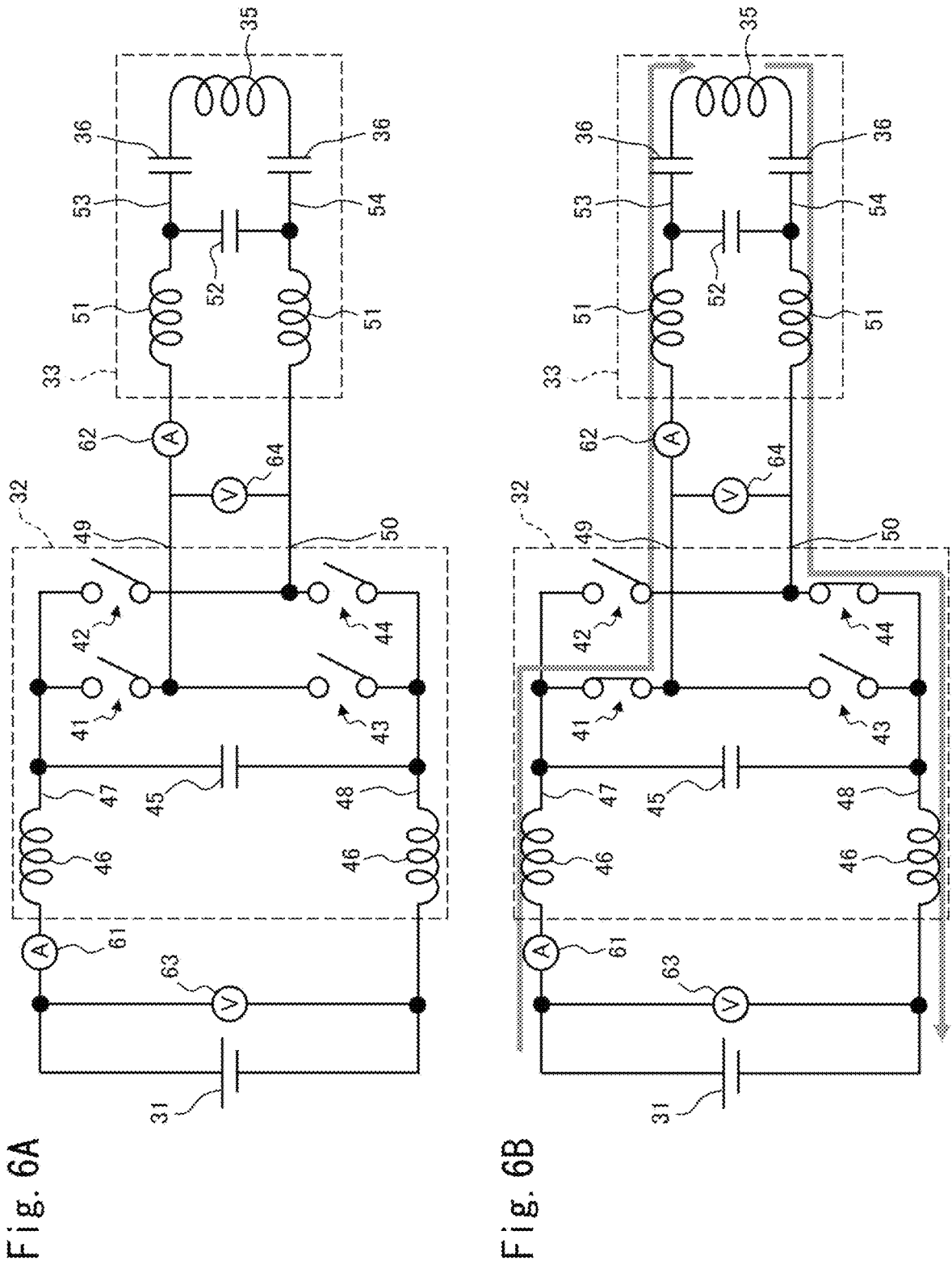
FIGS. 6A and 6B are diagrams schematically illustrating states of an electronic circuit when abnormality diagnosis of a sensor is performed.

Abnormality diagnosis of the sensors 61 to 64 will be described with reference to FIGS. 6 to 9. FIGS. 6A and 6B are diagrams schematically illustrating a state of the electronic circuit when the abnormality diagnosis of the sensors 61 to 64 is performed.

As illustrated in FIG. 6A, when the abnormality diagnosis is performed, first, all the switching transistors 41 to 44 of the inverter circuit 32 are turned off. As a result, no current flows through the inverter circuit 32 and the power transmission-side resonance circuit 33, and the current values detected by the first current sensor 61 and the second current sensor 62 are 0.

Thereafter, as illustrated in FIG. 6B, the first switching transistor 41 and the fourth switching transistor 44 of the inverter circuit 32 are turned on, and this state is maintained. In addition, the second switching transistor 42 and the third switching transistor 43 are turned off, and this state is maintained. As a result, a DC current flows through the power transmission-side resonance circuit 33. That is, in the present embodiment, when the abnormality diagnosis of the sensors 61 to 64 is performed, the inverter circuit 32 is controlled such that the DC voltage supplied from the power transmission-side rectifier circuit 31 is supplied to the power transmission-side resonance circuit 33 without being converted into the AC voltage.

At this time, the power source 2 or the power transmission-side rectifier circuit 31 may be controlled so that its output voltage is lower than that when the power is transmitted. In the inverter circuit 32, unlike the example illustrated in FIG. 6B, the second switching transistor 42 and the third switching transistor 43 may be turned on, and the first switching transistor 41 and the fourth switching transistor 44 may be turned off.

When the inverter circuit 32 is switched from the state (disconnection mode) illustrated in FIG. 6A to the state (DC mode) illustrated in FIG. 6B, ringing occurs in the inverter circuit 32 and the power transmission-side resonance circuit 33.

Figure 7:
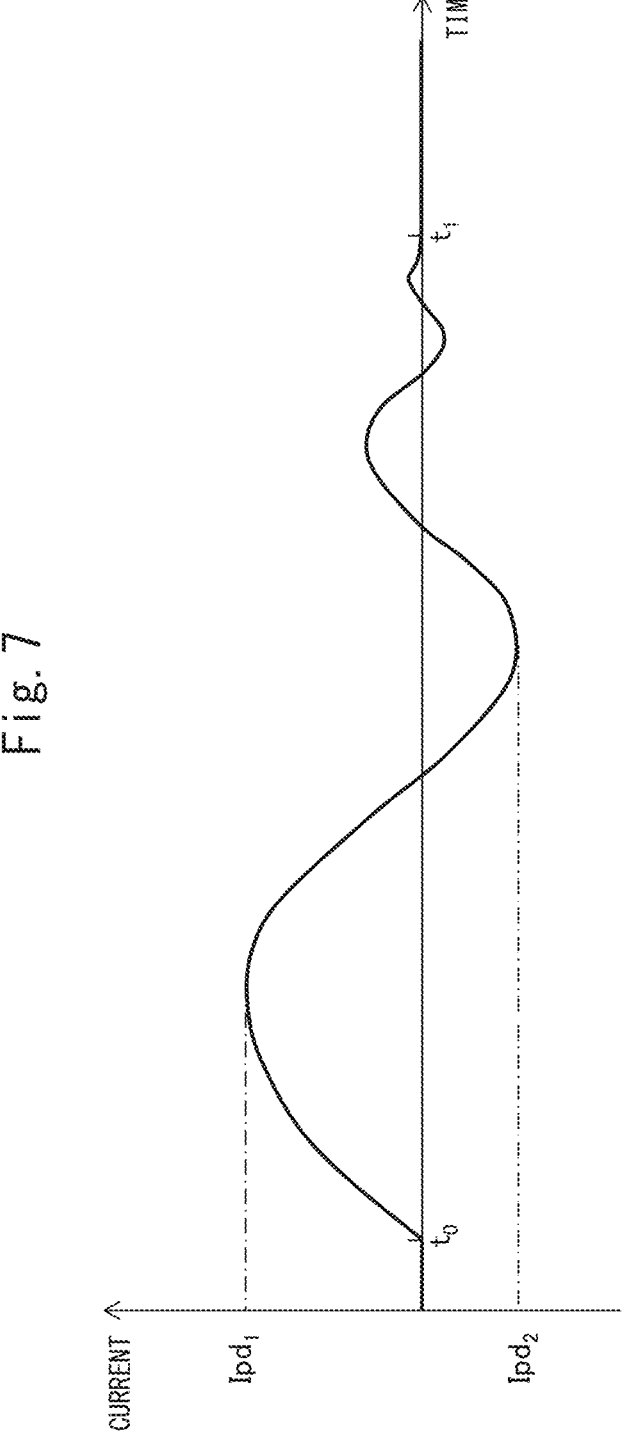
FIG. 7 is a diagram illustrating a temporal change in the current flowing through the electronic circuit when the inverter circuit is switched from a disconnection mode to a DC mode.

FIG. 7 is a diagram illustrating a temporal change in the current flowing through the electronic circuit when the inverter circuit 32 is switched from the disconnection mode to the DC mode. FIG. 7 illustrates, for example, a temporal change of a current value detected by the first current sensor 61 or the second current sensor 62. In particular, FIG. 7 illustrates a change when the inverter circuit 32 is switched from the disconnection mode to the DC mode at time to.

As illustrated in FIG. 7, until the inverter circuit 32 is switched at the time to, no current flows through the electronic circuit since the inverter circuit 32 is in the disconnection mode. When the inverter circuit 32 is switched to the DC mode at the time to, the ringing occurs by supplying of the DC current to the power transmission-side resonance circuit 33, and the current value detected by the first current sensor 61 or the second current sensor 62 oscillates up and down. Such ringing occurs because the inverter circuit 32 and the power transmission-side resonance circuit 33 include a coil and a capacitor.

The ringing occurring in this manner has a similar waveform as long as the voltage of the DC power supplied from the power transmission-side rectifier circuit 31 is the same. Therefore, the current value detected by the first current sensor 61 or the second current sensor 62 illustrated in FIG. 7 has a similar waveform each time the inverter circuit 32 is switched to the DC mode. Thus, for example, a first positive-side peak value $Ipd_1$ and a first negative-side peak value $Ipd_2$ of the current value detected by the first current sensor 61 or the second current sensor 62 after the inverter circuit 32 is switched to the DC mode are substantially the same design value corresponding to the voltage of the DC power every time.

Thereafter, when the inverter circuit 32 is maintained in the DC mode and the DC current continues to be supplied to the power transmission-side resonance circuit 33, such ringing converges at time $t_1$ as illustrated in FIG. 7. In the power transmission-side resonance circuit 33 of the present embodiment, the power transmission-side resonance capacitor 36 is connected in series to the first line 53, the second line 54, and the power transmission coil 35. Thus, when a charge corresponding to the voltage of the power transmission-side rectifier circuit 31 is accumulated in the power transmission-side resonance capacitor 36, a current does not flow in the power transmission-side resonance circuit 33. Therefore, as illustrated in FIG. 7, in the present embodiment, the current value detected by the first current sensor 61 or the second current sensor 62 converges to almost 0.

Figure 8:
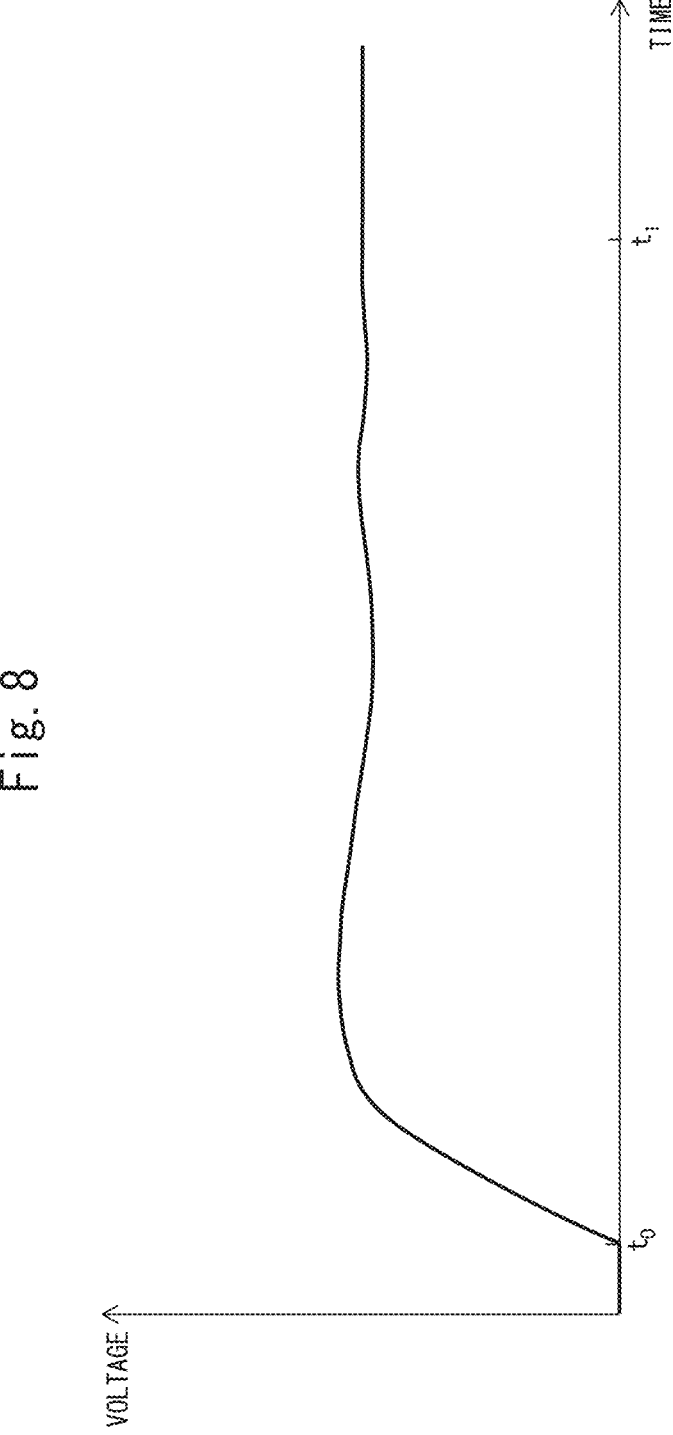
FIG. 8 is a diagram illustrating a temporal change in a voltage on the electronic circuit when the inverter circuit is switched from the disconnection mode to the DC mode.

FIG. 8 is a diagram illustrating a temporal change in a voltage flowing through the electronic circuit when the inverter circuit 32 is switched from the disconnection mode to the DC mode. FIG. 8 illustrates, for example, a temporal change of a voltage value detected by the first voltage sensor 63 or the second voltage sensor 64. FIG. 8 also illustrates the change when the inverter circuit 32 is switched from the disconnection mode to the DC mode at the time to.

As illustrated in FIG. 8, after the time to, the voltage value detected by the first voltage sensor 63 or the second voltage sensor 64 oscillates up and down due to the ringing. Thereafter, when the inverter circuit 32 is maintained in the DC mode and the DC voltage continues to be supplied to the power transmission-side resonance circuit 33, the ringing converges at the time $t_1$ as illustrated in FIG. 8. Therefore, after the time $t_1$, the same constant voltage value is detected by the first voltage sensor 63 and the second voltage sensor 64. In particular, the voltage values detected by the first voltage sensor 63 and the second voltage sensor 64 at this time are design values corresponding to the voltage of the DC power.

Here, a case where an abnormality occurs in the first current sensor 61 or the second current sensor 62 and an accurate current value cannot be detected is considered. In such a case, the first positive-side peak value $Ipd_1$ and the first negative-side peak value $Ipd_2$ detected after the inverter circuit 32 is switched to the DC mode are values different from the design values. Therefore, in the present embodiment, the presence or absence of an abnormality of the first current sensor 61 or the second current sensor 62 is diagnosed based on whether or not the first positive-side peak value $Ipd_1$ is within a predetermined range near the design value. In addition, in the present embodiment, the presence or absence of the abnormality of the first current sensor 61 or the second current sensor 62 is diagnosed based on whether or not the first negative-side peak value $Ipd_2$ is within a predetermined range near the design value. The predetermined range is, for example, ±several % or several ten % of the design value.

In addition, when an abnormality occurs in the first voltage sensor 63 or the second voltage sensor 64, the inverter circuit 32 is switched to the DC mode, and then after the ringing converges, different voltage values are detected by the first voltage sensor 63 and the second voltage sensor 64. Therefore, in the present embodiment, after the ringing converges, the presence or absence of the abnormality of the first voltage sensor 63 and the second voltage sensor 64 is diagnosed based on whether or not the voltage values detected by the first voltage sensor 63 and the second voltage sensor 64 are the same. That is, in the present embodiment, the abnormality of the voltage sensors 63 and 64 is diagnosed based on the detection values of the voltage sensors 63 and 63 after the ringing converges. Specifically, when the voltage values detected by the first voltage sensor 63 and the second voltage sensor 64 are the same after the ringing converges, the controller 34 determines that these sensors 63 and 64 are normal. On the other hand, when the voltage values detected by the first voltage sensor 63 and the second voltage sensor 64 are not the same, the controller 34 determines that one of the sensors 63 and 64 is abnormal. In addition to a case where a difference between both the voltages is 0, when the difference is within 1% or within several %, both the voltages are determined to be the same.

In particular, after the ringing converges in this manner, the detected voltage values of the voltage sensors 63 and 64 in which no abnormality has occurred become substantially the same design value corresponding to the voltage of the DC power. Therefore, in the present embodiment, when the voltage values detected by the first voltage sensor 63 and the second voltage sensor 64 are not the same, the controller 34 determines that an abnormality has occurred in the voltage sensor that detects a value far from the design value.

As described above, in the present embodiment, the abnormality of the sensors 61 to 64 is diagnosed based on the detection values of the sensors 61 to 64 when the inverter circuit 32 is controlled to the DC mode. This makes it possible to diagnose abnormality of the sensors 61 to 64 provided in the ground power supply device 1. In particular, by controlling the inverter circuit 32 to the DC mode, it is not necessary to add any component for abnormality diagnosis of the sensors 61 to 64, and the abnormality of the sensors 61 to 64 can be diagnosed at a relatively low cost.

Figure 9:
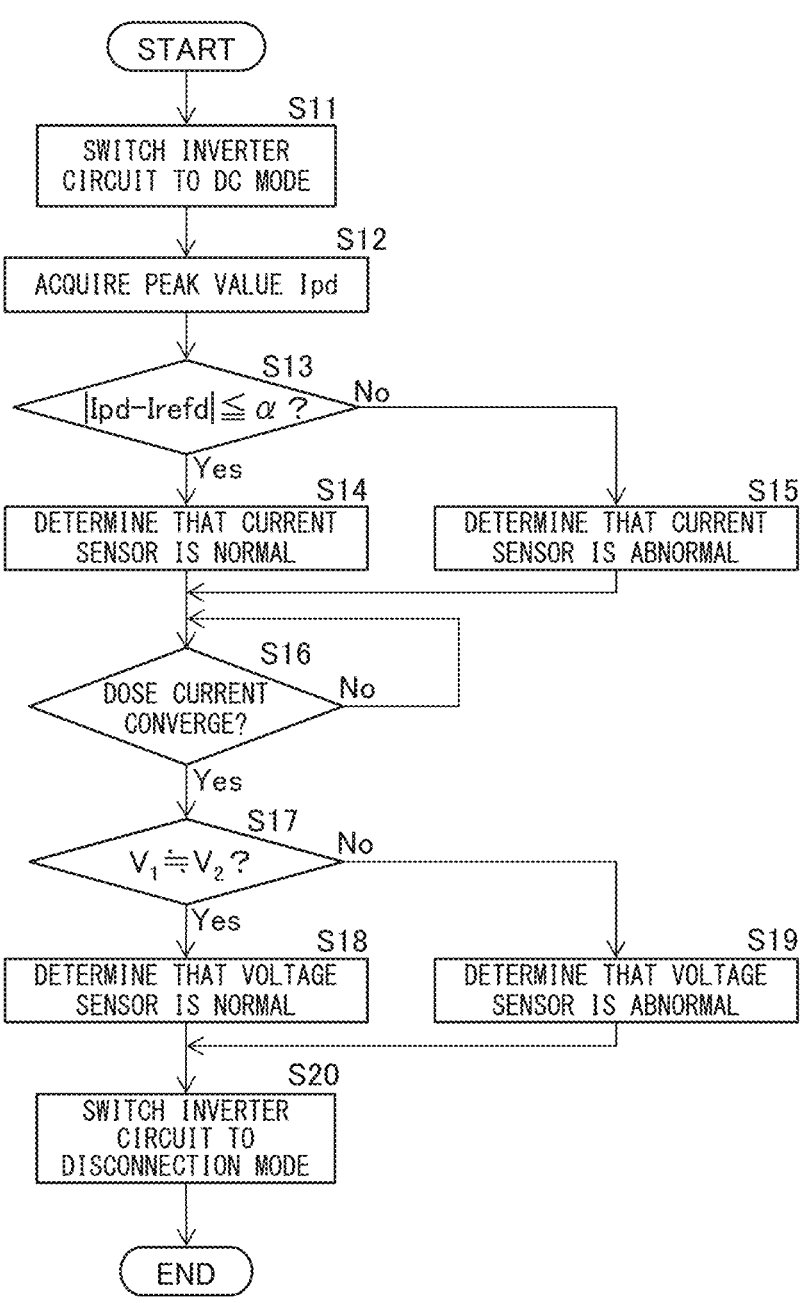
FIG. 9 is a flowchart illustrating a flow of a diagnosis process for diagnosing an abnormality of the sensor.

FIG. 9 is a flowchart illustrating a flow of a diagnosis process for diagnosing the abnormality of the sensors 61 to 64. The illustrated diagnosis process is executed by the controller 34 at an arbitrary timing (for example, every certain period of time).

As illustrated in FIG. 9, in the abnormality diagnosis of the sensors 61 to 64, the controller 34 first switches the inverter circuit 32 from the disconnection mode to the DC mode (step S11). Next, the controller 34 acquires the peak value Ipd (for example, the first positive-side peak value $Ipd_1$ and the first negative-side peak value $Ipd_2$) of the current value detected by the first current sensor 61 or the second current sensor 62 (step S12).

Next, the controller 34 determines whether or not the peak value Ipd acquired in step S12 is within a predetermined range $\alpha$ near a corresponding set value Irefd (step S13). Therefore, for example, the controller 34 determines whether or not a difference between the first positive-side peak value $Ipd_1$ and a first set value $Irefd_1$ corresponding to the first positive-side peak value is within the predetermined range $\alpha$. When it is determined in step S13 that the peak value Ipd is within the predetermined range near the set value Irefd, the controller 34 determines that the first current sensor 61 or the second current sensor 62 is normal (step S14). On the other hand, when it is determined in step S13 that the peak value Ipd is not within the predetermined range near the set value Irefd, the controller 34 determines that an abnormality has occurred in the first current sensor 61 or the second current sensor 62 (step S15).

Thereafter, the controller 34 determines whether or not the current value detected by the first current sensor 61 or the second current sensor 62 has converged (step S16). For example, when the detected current value falls within a predetermined current width over a predetermined time, it is determined that the current value has converged. When it is determined in step S16 that the detected current value has not converged, step S16 is repeated.

On the other hand, when it is determined in step S16 that the detected current value has converged, it is determined whether or not a voltage value $V_1$ detected by the first voltage sensor 63 at this time and a voltage value $V_2$ detected by the second voltage sensor 64 are the same (step S17). When it is determined in step S17 that the detected voltage value $V_1$ of the first voltage sensor 63 and the detected voltage value $V_2$ of the second voltage sensor 64 are the same, the controller 34 determines that both the first voltage sensor 63 and the second voltage sensor 64 are normal (step S18). On the other hand, when it is determined in step S18 that the detected voltage value $V_1$ of the first voltage sensor 63 and the detected voltage value $V_2$ of the second voltage sensor 64 are not the same, the controller 34 determines that an abnormality has occurred in either the first voltage sensor 63 or the second voltage sensor 64 (step S19). In particular, in the present embodiment, the controller 34 determines that an abnormality has occurred in the voltage sensors 63 and 64 that detect a value far from the design value among the detected voltage value $V_1$ of the first voltage sensor 63 and the detected voltage value $V_2$ of the second voltage sensor 64.

Thereafter, the controller 34 switches the inverter circuit 32 from the DC mode to the disconnection mode (step S20). As a result, the diagnosis process ends.

Modified Example

In the above embodiment, the abnormality diagnosis of the current sensors 61 and 62 is performed based on the first positive-side peak value $Ipd_1$ and the first negative-side peak value $Ipd_2$. However, the abnormality diagnosis may be performed based on the second and subsequent positive-side and negative-side peak values. For example, the abnormality diagnosis of the current sensors 61 and 62 may be performed based on a parameter other than the peak value related to the ringing, such as a current rise speed immediately after the inverter circuit 32 is switched to the DC mode.

In the above embodiment, the abnormality diagnosis of the voltage sensors 63 and 64 is performed based on whether or not the detected voltage values of the two voltage sensors 63 and 64 after the ringing convergence are the same. However, the abnormality diagnosis of the current sensors 61 and 62 may be performed based on whether or not the detected current values of the two current sensors 61 and 62 after the ringing convergence are the same. However, in this case, in order to distinguish from a case where an abnormality occurs in the current sensors 61 and 62 and the detected current value does not vary from 0, it may be assumed that the current sensors 61 and 62 detect a variation in the current value associated with the ringing.

In addition, in the above embodiment, when the inverter circuit 32 is set to the DC mode, the abnormality diagnosis of the voltage sensors 63 and 64 is performed based on whether or not the detected voltage values of the two voltage sensors 63 and 64 are the same after the ringing converges. However, when the inverter circuit 32 is set to the DC mode, the presence or absence of an abnormality of the voltage sensors 63 and 64 may be determined based on whether or not the detected voltage values of the voltage sensors 63 and 64 are within a predetermined range near the design value after the ringing converges. Similarly, when the inverter circuit 32 is set to the DC mode, the presence or absence of an abnormality of the current sensors 61 and 62 may be determined based on whether or not the detected voltage values of the current sensors 61 and 62 are within a predetermined range near a design value (0 in the present embodiment) after the ringing converges.

In the above embodiment, the two current sensors 61 and 62 and the two voltage sensors 63 and 64 are provided. However, only one current sensor and one voltage sensor may be provided. In this case, for example, the second current sensor 62 and the second voltage sensor 64 are provided between the inverter circuit 32 and the power transmission-side resonance circuit 33, and the first current sensor 61 and the first voltage sensor 63 are omitted. In the above embodiment, although the ground power supply device 1 is provided with both the current sensors 61 and 62 and the voltage sensors 63 and 64, only one of these (for example, only the current sensors 61 and 62) may be provided.

In the above embodiment, when the abnormality diagnosis of the sensors 61 to 64 is performed, the inverter circuit 32 is switched from the disconnection mode to the DC mode. However, the abnormality diagnosis of the sensors 61 to 64 may be performed when the inverter circuit 32 is switched from a mode other than the disconnection mode to the DC mode.

Second Embodiment

Next, a ground power supply device 1 according to a second embodiment will be described with reference to FIG. 10. The configuration and control of the ground power supply device 1 according to the second embodiment are basically similar to the configuration and control of the ground power supply device 1 according to the first embodiment. Hereinafter, portions different from the ground power supply device according to the first embodiment will be mainly described.

In the ground power supply device 1 according to the first embodiment, the abnormality of the current sensors 61 and 62 is diagnosed based on the parameter (peak value) related to the ringing. However, in the present embodiment, after an inverter circuit 32 is maintained in the DC mode until the ringing converges, the inverter circuit 32 is switched to the AC mode, and the abnormality diagnosis of the current sensor 61 is performed based on the detection values of the current sensors 61 and 62 at this time.

Specifically, in the present embodiment, the inverter circuit 32 is maintained in the DC mode until the ringing converges (until the time $t_1$ in FIG. 7). Then, as in the first embodiment, abnormality diagnosis of a first voltage sensor 63 and a second voltage sensor 64 is performed based on the detected voltage values of the voltage sensors 63 and 64 immediately after the ringing converges.

Thereafter, in the present embodiment, the inverter circuit 32 is switched to the AC mode. In the AC mode, as described with reference to FIGS. 5A and 5B, the first connection state and the second connection state are intermittently and alternately repeated, and the AC power of, for example, 85 kHz is output from output terminals 49 and 50 of the inverter circuit 32. Therefore, the controller 34 controls the inverter circuit 32 to supply a predetermined AC voltage to the power transmission-side resonance circuit 33. However, at this time, the inverter circuit 32 or a power transmission-side rectifier circuit 31 is controlled so that the output power is lower than that when the power is transmitted. Specifically, the output power is reduced by increasing a disconnection time during the first connection state, during the second connection state, or between the first connection state and the second connection state in the inverter circuit 32. Alternatively, the output power is lowered by lowering the output voltage by the power transmission-side rectifier circuit 31. At this time, the inverter circuit 32 or the power transmission-side rectifier circuit 31 is controlled based on the detected voltage values of the first voltage sensor 63 and the second voltage sensor 64.

In the present embodiment, abnormality diagnosis of the current sensors 61 and 62 is performed based on the detection values of the current sensors 61 and 62 when the inverter circuit 32 is set to the AC mode. For example, the abnormality diagnosis of the current sensors 61 and 62 is performed based on whether or not the positive-side or negative-side peak value of the detected current value of the current sensors 61 and 62 that is fluctuating is within a predetermined range near the design value. Specifically, when the positive-side or negative-side peak values of the detected current values of the current sensors 61 and 62 are within a predetermined range, it is determined that the current sensors 61 and 62 are normal. On the other hand, when the positive-side or negative-side peak values of the detected current values of the current sensors 61 and 62 are not within the predetermined range, it is determined that an abnormality has occurred in the current sensors 61 and 62.

According to the present embodiment, after the abnormality diagnosis of the voltage sensors 63 and 64 is completed, the inverter circuit 32 or the power transmission-side rectifier circuit 31 is controlled based on the detection values of the voltage sensors 63 and 64. Therefore, since the abnormality diagnosis of the voltage sensors 63 and 64 has already been completed, the inverter circuit 32 or the power transmission-side rectifier circuit 31 is appropriately controlled based on the detection values of the voltage sensors 63 and 64. Thus, the abnormality diagnosis of the current sensors 61 and 62 can also be appropriately performed.

In the present embodiment, the abnormality diagnosis is performed based on the peak values of the detected current values of the current sensors 61 and 62 when the inverter circuit 32 is set to the AC mode. However, the abnormality diagnosis of the current sensors 61 and 62 may be performed based on a parameter other than the peak value related to the AC current, such as a maximum rise speed of the detected current value of the current sensors 61 and 62. Also in the present embodiment, the abnormality diagnosis of the current sensors 61 and 62 may be performed based on the parameter related to the ringing as in the first embodiment.

Figure 10:
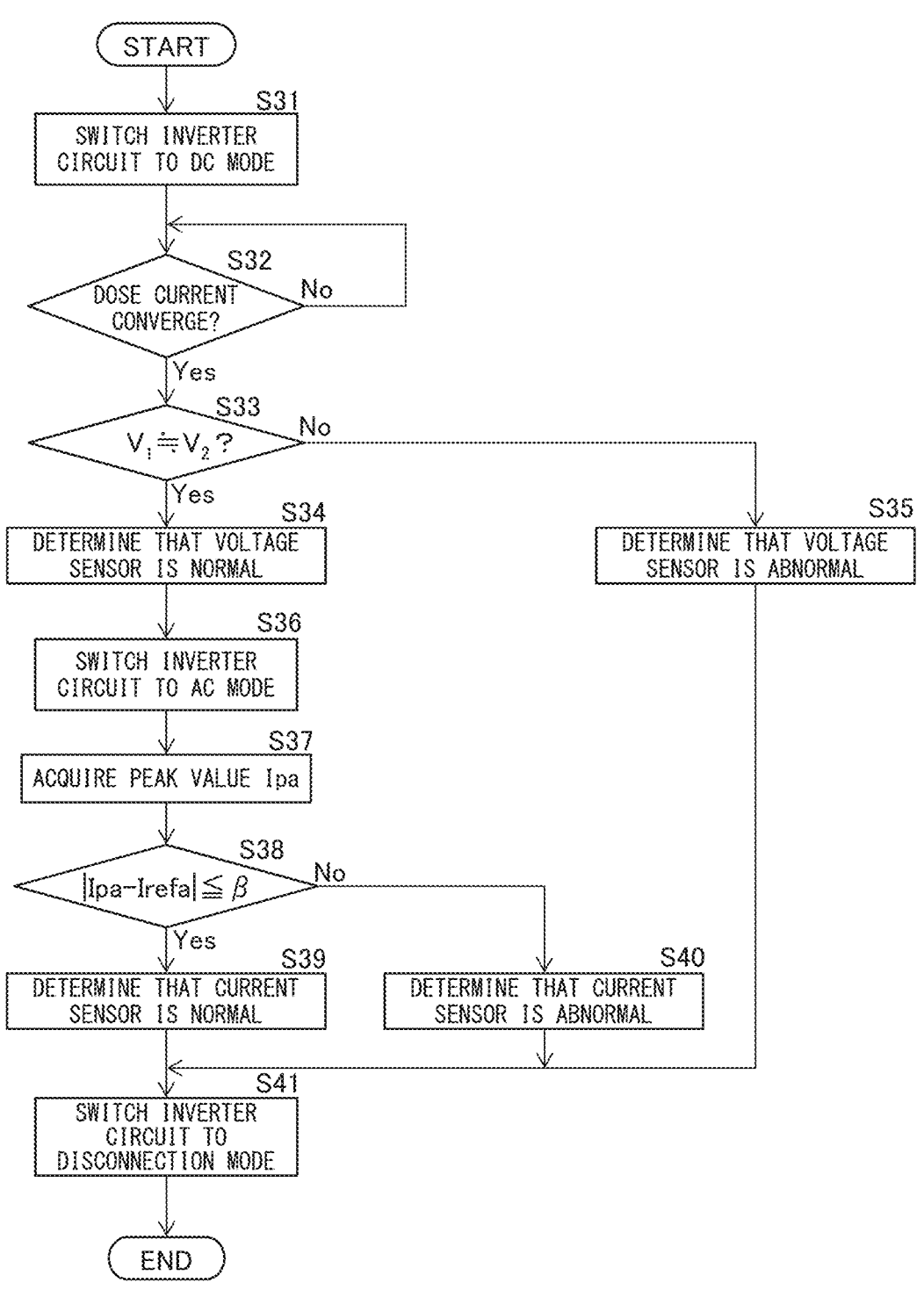
FIG. 10 is a flowchart illustrating a flow of the diagnosis process for diagnosing the abnormality of the sensor.

FIG. 10 is a flowchart illustrating a flow of a diagnosis process for diagnosing the abnormality of the sensors 61 to 64. The illustrated diagnosis process is executed by the controller 34 at an arbitrary timing (for example, every certain period of time). Steps S31 to S35 in FIG. 10 are similar to steps S11 and S16 to S19 in FIG. 9, and thus description thereof is omitted. In the present embodiment, when it is determined that there is an abnormality in the voltage sensors 63 and 64 (step S35), abnormality determination of the current sensor (steps S36 to S40) is skipped.

As illustrated in FIG. 10, when the abnormality diagnosis of the voltage sensor is completed, the controller 34 switches the inverter circuit 32 from the DC mode to the AC mode (step S36). Next, the controller 34 acquires a peak value Ipa of the current value detected by the first current sensor 61 or the second current sensor 62 (step S37). Thereafter, the controller 34 determines whether or not the peak value Ipa acquired in step S34 is within a predetermined range β near a corresponding set value Irefa (step S38). When it is determined in step S38 that the peak value Ipa is within the predetermined range near the set value Irefa, the controller 34 determines that the first current sensor 61 or the second current sensor 62 is normal (step S39). On the other hand, when it is determined in step S38 that the peak value Ipa is not within the predetermined range near the set value Irefa, the controller 34 determines that an abnormality has occurred in the first current sensor 61 or the second current sensor 62 (step S40).

Thereafter, the controller 34 switches the inverter circuit 32 from the DC mode to the disconnection mode (step S41). As a result, the diagnosis process ends.

Although the preferred embodiments according to the present invention have been described above, the present invention is not limited to these embodiments, and various modifications and changes can be made within the scope of the claims.

REFERENCE SIGNS LIST

1 Ground power supply device
5 Vehicle
14 Power reception unit
31 Power transmission-side rectifier circuit
32 Inverter circuit
33 Power transmission-side resonance circuit

34 Controller

35 Power transmission coil

61, 62 Current sensor

63, 64 Voltage sensor

The invention claimed is:

1. A power supply device that transmits a power in a wireless manner, the power supply device comprising:

a DC power source;

an inverter circuit connected to the DC power source;

a resonance circuit connected to the inverter circuit and including a power transmission coil;

a sensor that detects a current value flowing through the circuits or a voltage value applied to the circuits; and a control device connected to the inverter circuit and the sensor, wherein the control device controls, when causing the power supply device to transmit the power in a wireless manner, the inverter circuit to convert a DC voltage supplied from the DC power source into an AC voltage and supply the AC voltage to the resonance circuit, and controls, when diagnosing the abnormality of the sensor, the inverter circuit to supply the DC voltage supplied from the DC power source to the resonance circuit without converting the DC voltage into the AC voltage and diagnoses an abnormality of the sensor based on a detection value of the sensor at this time.

2. The power supply device according to claim 1, wherein the control device diagnoses the abnormality of the sensor based on the detection value of the sensor after ringing occurring in the resonance circuit by a DC current being supplied to the resonance circuit converges.

3. The power supply device according to claim 1, wherein the sensor includes a first sensor that detects a current value or a voltage value between the DC power source and the inverter circuit, and a second sensor that detects a current value or a voltage value between the inverter circuit and the resonance circuit, and the control device diagnoses that the first sensor and the second sensor are normal when the current value or the voltage value detected by the first sensor and the current value or the voltage value detected by the second sensor are the same when the DC voltage is supplied to the resonance circuit.

4. The power supply device according to claim 1, wherein the sensor includes a sensor that detects a current value or a voltage value between the inverter circuit and the resonance circuit, and the control device determines that the sensor is normal when the current value or the voltage value detected by the sensor when the DC voltage is supplied to the resonance circuit is within a preset predetermined range.

5. The power supply device according to claim 1, wherein the sensor includes a current sensor that detects a current value, and the control device diagnoses an abnormality of the current sensor based on a parameter related to ringing occurring in the current value detected by the current sensor by the DC voltage being supplied to the resonance circuit.

6. The power supply device according to claim 1, wherein the sensor includes a current sensor that detects a current value, and the control device controls the inverter circuit to supply a predetermined AC voltage to the resonance circuit after ringing occurring in the resonance circuit when the DC voltage is supplied to the resonance circuit converges, and diagnoses an abnormality of the current sensor based on a detection value of the current sensor at this time.

* * * * *